(12) United States Patent
Kelly et al.

(10) Patent No.: US 7,802,092 B1
(45) Date of Patent: Sep. 21, 2010

(54) METHOD AND SYSTEM FOR AUTOMATIC SECURE DELIVERY OF APPLIANCE UPDATES

(75) Inventors: Thomas J. Kelly, Fergus (CA); Gary W. Tomic, Waterloo (CA)

(73) Assignee: Blue Coat Systems, Inc., Sunnyvale, CA (US)

(*) Notice: Subject to any disclaimer, the term of this patent is extended or adjusted under 35 U.S.C. 154(b) by 1014 days.

(21) Appl. No.: 11/242,213

(22) Filed: Sep. 30, 2005

(51) Int. Cl.
   *H04L 29/06* (2006.01)
(52) U.S. Cl. .................. 713/156; 713/155; 713/175
(58) Field of Classification Search ......... 713/155–159, 713/161, 168, 176; 709/229; 726/2, 11–15
   See application file for complete search history.

(56) References Cited

U.S. PATENT DOCUMENTS

| | | | |
|---|---|---|---|
| 6,832,373 B2 * | 12/2004 | O'Neill | 717/171 |
| 6,938,154 B1 * | 8/2005 | Berson et al. | 713/156 |
| 7,120,797 B2 * | 10/2006 | Wheeler | 713/176 |
| 7,225,341 B2 * | 5/2007 | Yoshino et al. | 713/193 |
| 2003/0237004 A1 * | 12/2003 | Okamura | 713/201 |
| 2004/0266533 A1 * | 12/2004 | Gentles et al. | 463/42 |
| 2005/0004735 A1 * | 1/2005 | Kelly et al. | 701/50 |
| 2005/0144616 A1 * | 6/2005 | Hammond et al. | 717/173 |
| 2005/0166051 A1 * | 7/2005 | Buer | 713/173 |
| 2005/0246290 A1 * | 11/2005 | Kausik | 705/67 |
| 2007/0028120 A1 * | 2/2007 | Wysocki et al. | 713/192 |
| 2007/0168657 A1 * | 7/2007 | Carro | 713/156 |

OTHER PUBLICATIONS

DSL Forum; CPE WAN Management Protocol; http://www.dslforum.org/aboutdsl/Technical_Reports/TR-069.pdf; accessed Jun. 21, 2005; 109 pp.
Cisco System's Simple Certificate Enrollment Protocol; White Paper; http://web.archive.org/web120050403213200/http://www.cisco.com/warp/public/cc/pd/sqsw/tech/scep_wp.htm; accessed Jun. 22, 2005; 49 pp.

* cited by examiner

*Primary Examiner*—Matthew B Smithers
*Assistant Examiner*—Jing Sims
(74) *Attorney, Agent, or Firm*—Sonnenschein Nath & Rosenthal LLP (57) ABSTRACT

A system and method to securely deliver software updates to an appliance are provided. The system comprises a key generator, a reporting module, and a certificate signing request (CSR) module. The key generator may be configured to generate, at the processing system, verification data for the processing system. The reporting module may be configured to communicate the verification data from the processing system to a verification database. The certificate signing request (CSR) module may be configured to obtain a signed certificate from a certificate authority (CA) based on the verification data stored in the verification database.

20 Claims, 7 Drawing Sheets

METHOD AND SYSTEM FOR AUTOMATIC SECURE DELIVERY OF APPLIANCE UPDATES

FIELD OF THE INVENTION

The present invention generally pertains to the field of processing systems. Specifically, the present invention pertains to method and system for automatic secure delivery of appliance software updates.

BACKGROUND

Appliances are special-purpose computer systems, such as, for example, storage servers and proxy servers. Special-purpose computer systems may be implemented as network-attached appliances and may run system software, such as embedded operating systems, device drivers, or various utilities. While an appliance may be sold with a particular version of system software loaded on it, updates to such software, e.g., an upgrade to the embedded operating system or a policy module, or a software patch addressing a defect, may become available after the appliance has been placed in service. Controlling access to such upgrades or patches is important from the appliance vendor's point of view (inasmuch as the vendor seeks to ensure that only authorized customers receive the benefit of the new software) and the appliance owner/user's point of view (inasmuch as the owner/user wishes to maintain configuration control over his/her equipment).

As one might expect, different methods for implementing these access controls have developed. In some cases, an appliance owner/user is assigned a unique user name/password combination at the time the appliance is purchased or first placed in service. As software updates for the corresponding appliance become available, the owner/user may request the update (e.g., from a server storing the updated software) and use his/her user name/password in order to authenticate the request. When a user name/password combination is presented to the download server, the customer's entitlement to the software update is checked, and, if it is determined that the customer is indeed entitled to the update, the appropriate software components are supplied. This scheme requires significant customer interaction with a download server, which may be inconvenient, and also requires that the customer remember or otherwise retain the user name/password credentials, sometimes several months or even years after the original purchase (while it is true that some vendors offer assistance to those customers that cannot remember their user name/password combinations, the provision of such support tends to decrease the vendor's confidence that the requesting customer is truly entitled to a particular update and increases the costs of the appliance manufacturer).

Furthermore, where a customer's entitlement to a software update is verified utilizing a user name/password combination originally assigned at the time of purchase, these credentials can be used to download the content (e.g., software updates or patches) to a system other than the appliance itself. Thus, stolen credentials, for example, can be used to download illicit copies of the content, which may lead to a possibility of arbitrary downloads. For example, content may be installed on appliances that are not entitled to those particular updates, or, for example, updates may be installed on appliances owned by those customers that have not paid for that particular update.

SUMMARY

A method and system for automatic secure delivery of appliance software updates are described. In one embodiment, the system includes a key generator, a reporting module, and a certificate signing request (CSR) module. The key generator may be configured to generate, at the processing system, verification data for the processing system. The reporting module may be configured to communicate the verification data from the processing system to a verification database. The certificate signing request (CSR) module may be configured to obtain a signed certificate from a certificate authority (CA) based on the verification data stored in the verification database.

Other features of the present invention will be apparent from the accompanying drawings and from the detailed description, which follows.

BRIEF DESCRIPTION OF THE DRAWINGS

The present invention is illustrated by way of example, and not limitation, in the figures of the accompanying drawings in which.

DETAILED DESCRIPTION

In order to alleviate the problems associated with authentication mechanisms based on credentials supplied by a customer, a system and method may be provided that utilize Secure Sockets Layer (SSL) with mutual endpoint authentication. In one embodiment of the invention, each appliance is manufactured with a unique cryptographically verifiable identity. This unique cryptographically verifiable identity may include a combination of a public key from a manufacturing key pair generated at the appliance and the serial number for the appliance. In one embodiment, the manufacturing process captures the information necessary for a server (e.g., certificate authority server) to verify this identity without revealing the information that may be used by an impostor to masquerade as the appliance.

Specifically, in one embodiment of the present invention, the appliance generates an RSA key-pair during the manufacturing process (a manufacturing key pair). The cryptographically verifiable identity including the public key from the manufacturing key pair and the serial number for the appliance is communicated to a database that may be later used to authenticate the appliance. This cryptographically verifiable identity may be used to bootstrap to a certificate, e.g., an X.509 certificate, signed by a designated certificate authority.

The designated certificate authority may be associated with the entity that produces target appliances or it may be any certificate authority. The appliance may subsequently use the X.509 (or other) certificate to authenticate itself to the entitlement server. The entitlement server, in turn, may use the information from the certificate to determine what updates the subject appliance is entitled to.

Figure 1:
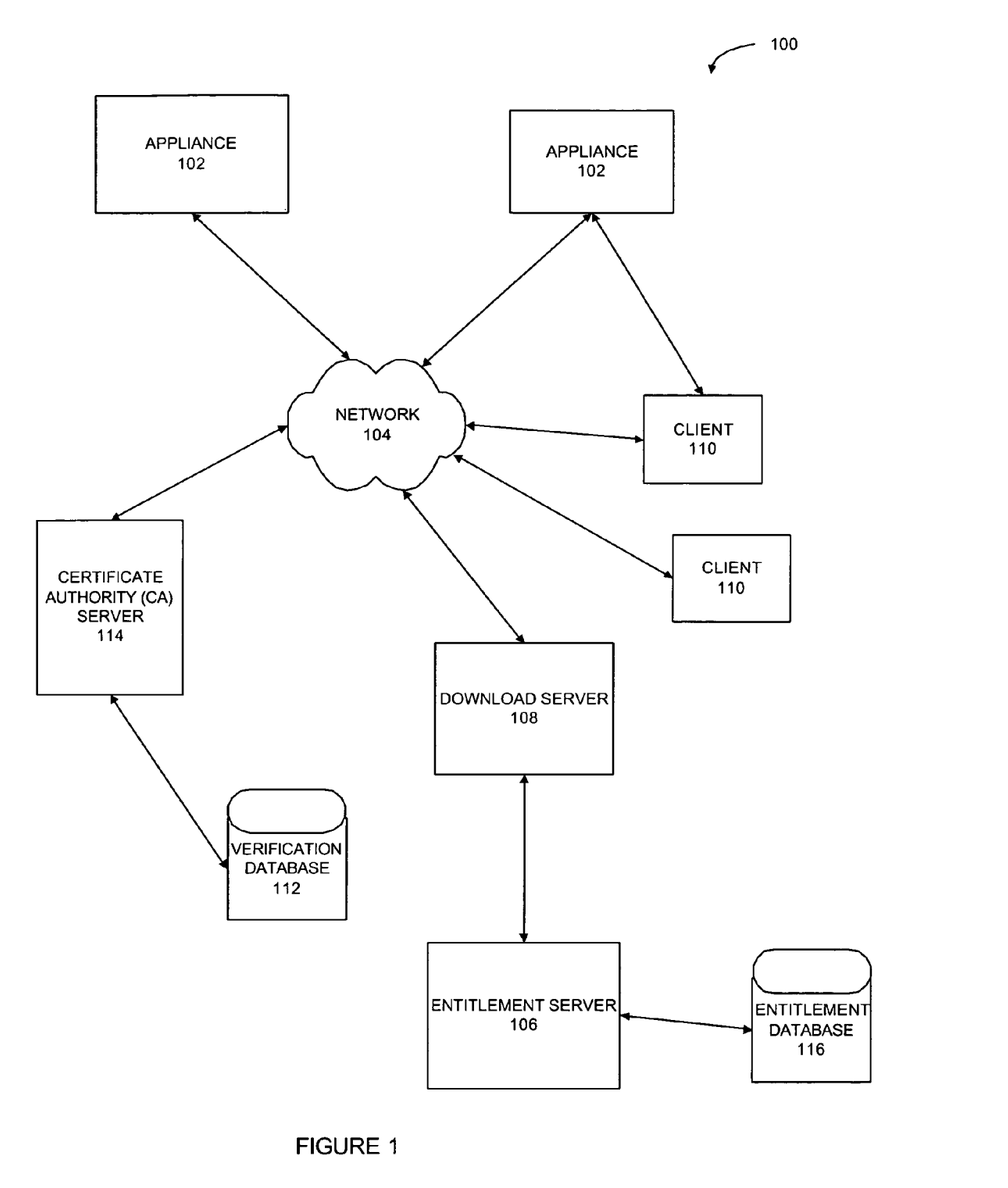
FIG. 1 shows a network environment within which a system for automatic delivery of appliance updates may be utilized, according to one exemplary embodiment of the present invention.

FIG. 1 shows a network environment 100 within which the system for automatic delivery of appliance updates may be utilized, according to one exemplary embodiment of the present invention. In FIG. 1, appliances 102 may be in communication with clients 110, as well as with various servers. The servers may include, for example, an entitlement server 106, a download server 108, and a certificate authority server 114 (CA server). In one embodiment, the CA server 114 authenticates requests for X.509 certificates using the appliance's cryptographically verifiable identity and signs X.509 certificates for the appliances. For example, when an appliance 102 attempts to obtain a signed certificate, it sends a certificate signing request to the CA server 114. The CA server 114 may consult a verification database to determine if the certificate signing request is valid and if the requesting appliance 102 should receive the signed certificate. It will be noted, that the verification database 112 may reside on a hardware platform on which the CA server 114 is executing, or on some other platform.

The entitlement server 106, in one embodiment, may be utilized to determine whether an entity that is requesting content, such as a software update, is entitled to the requested content. The download server 108 may be utilized to provide content to requesting entities (e.g., to one of the appliances 102) that are entitled to receive such content. In some cases, servers 106 and 108 may be processes executing on a common hardware platform, while in other cases these processes may execute on physically different hardware platforms, as illustrated in the drawing.

In order to verify the entitlement or lack of entitlement of an appliance to specific content, the entitlement server 106 may access an entitlement database 116. The entitlement database 116 may store identification information for appliances, as well as other authorization data. It will be noted, that the entitlement database 116 may reside on a hardware platform on which either one or both of the entitlement server 106 and/or the download server 108 are executing, or on some other platform.

Figure 2:
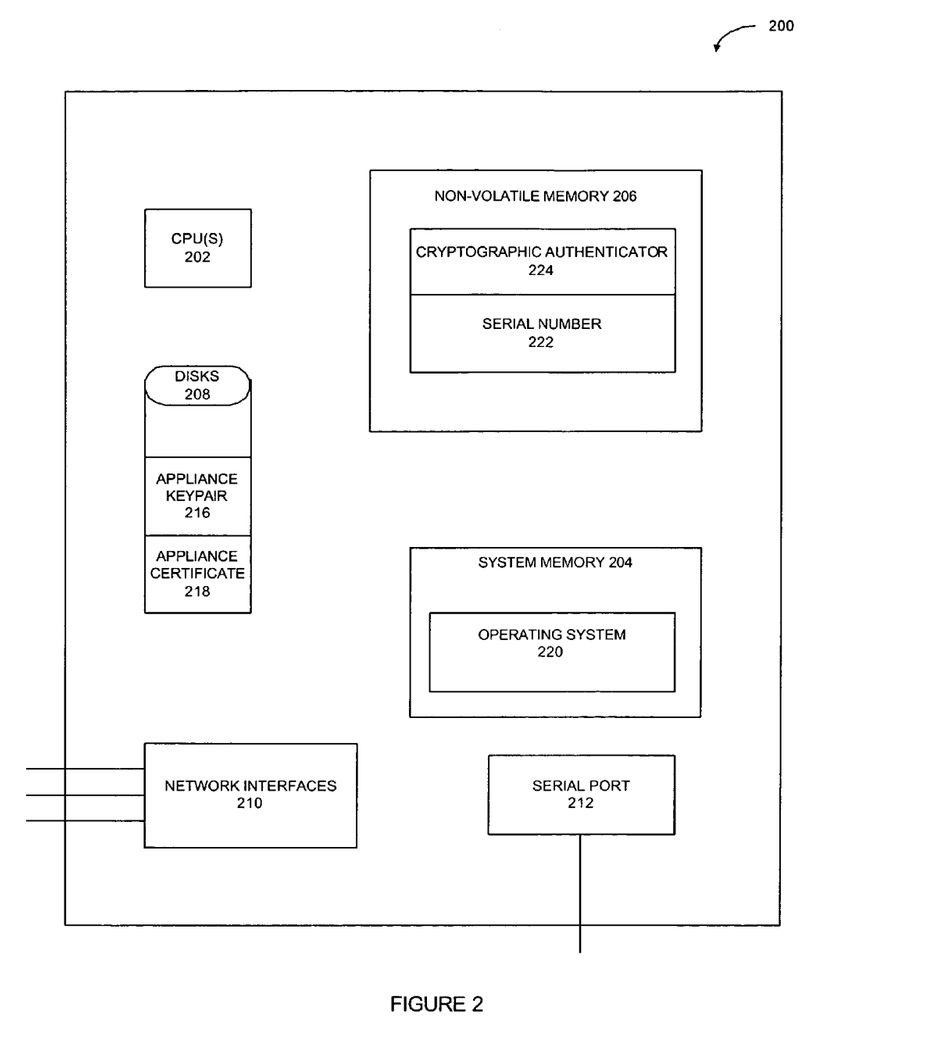
FIG. 2 is a block diagram of an appliance, according to one exemplary embodiment of the present invention.

FIG. 2 is a block diagram of an appliance 200 that may be configured to communicate with other devices (e.g., over the network 104 shown in FIG. 1) utilizing SSL, according to one exemplary embodiment of the present invention. SSL provides endpoint authentication and communication privacy over the Internet or other networks to allow client/server applications to communicate in a way designed to prevent eavesdropping, tampering, and message forgery. More specifically, SSL utilizes a cryptographic scheme that uses two keys to encrypt/decrypt data a public key that may be disclosed to others and a private or secret key known only to the recipient of the message thereby assuring the sender and recipient of the confidentiality of a message even if the message is intercepted by someone other than the intended recipient.

The appliance 200, in one embodiment, includes one or more CPUs 202, system memory 204, non-volatile memory 206, a persistent storage device such as one or more hard disks 208, one or more network interfaces 210, and a serial port 212. The system memory 204 may store an operating system 220 for the appliance 200, which operating system may be executed by the CPU(s) 202 in the conventional fashion. The disk(s) 208 may store a cryptographic key-pair 216 for the appliance, the digital certificate for the appliance (e.g., as signed by a designated certification authority), and other data.

The non-volatile memory 206 may be represented by any non-volatile memory device, such as a read only memory (ROM), programmable ROM (PROM), electrically erasable programmable read-only memory (EEPROM), flash memory, etc. The non-volatile memory 206, in one embodiment, may store information that is specific to the appliance 200, such as the appliance's serial number 222 and the appliance's cryptographic authenticator 224. The cryptographic authenticator 224, in one embodiment, is represented by a pair of prime numbers. The prime numbers stored in the non-volatile memory 206 may be intended to allow the appliance to recreate the cryptographically secure identity generated during the manufacturing process.

As mentioned above, according to one aspect of the invention, when an appliance is being manufactured, the appliance generates a random RSA key-pair (the manufacturing key-pair), which is unique to the appliance. (RSA, as is well known in the art, is a public key cryptographic system developed by Rivest, Shamir & Adelman that utilizes two large prime numbers to generate a public key that may be revealed to another entity and a private key that is intended to remain secret.) The data needed in order to re-generate the manufacturing key-pair may be stored in the non-volatile memory on the appliance.

In one embodiment, where the non-volatile memory 206, such as an EEPROM, does not have sufficient space to store the entire manufacturing private key from the manufacturing key, the non-volatile memory 206, instead, stores the two prime numbers (referred to as p and q in cryptographic parlance) that are needed in order to re-generate the key. In one embodiment, the public exponent "e" is fixed for all appliances. The two primes (p and q), in one embodiment, correspond to the cryptographic authenticator 224.

During the manufacturing process, information about the appliance is captured and sent to a verification database (e.g., the verification database 112 of FIG. 1). This information (the cryptographically secure identity of the appliance) may include the appliance's serial number and the RSA public key (the manufacturing public key) derived from the private key (the manufacturing private key) that can be reconstructed from the prime numbers stored in the non-volatile memory 206. This cryptographically secure identity of the appliance is recorded, to store an association between the appliance serial number and the public key generated during the manufacturing process (the manufacturing public key).

The manufacturing private key for the appliance may be difficult to change if compromised, inasmuch as it requires that the appliance be physically returned to the manufacturer's site. Therefore, in order to mitigate the possibility of the manufacturing key-pair being compromised by a factoring attack, in one embodiment of the invention, the manufacturing public key is treated as "semi-private." In particular, the manufacturing public key is kept confidential at a designated certification authority and is used only to verify X.509 Certificate Signing Requests (CSRs) received from the appliance. The designated certification authority may, in some cases be the manufacturer of the appliance, or it may be a different entity.

Figure 3:
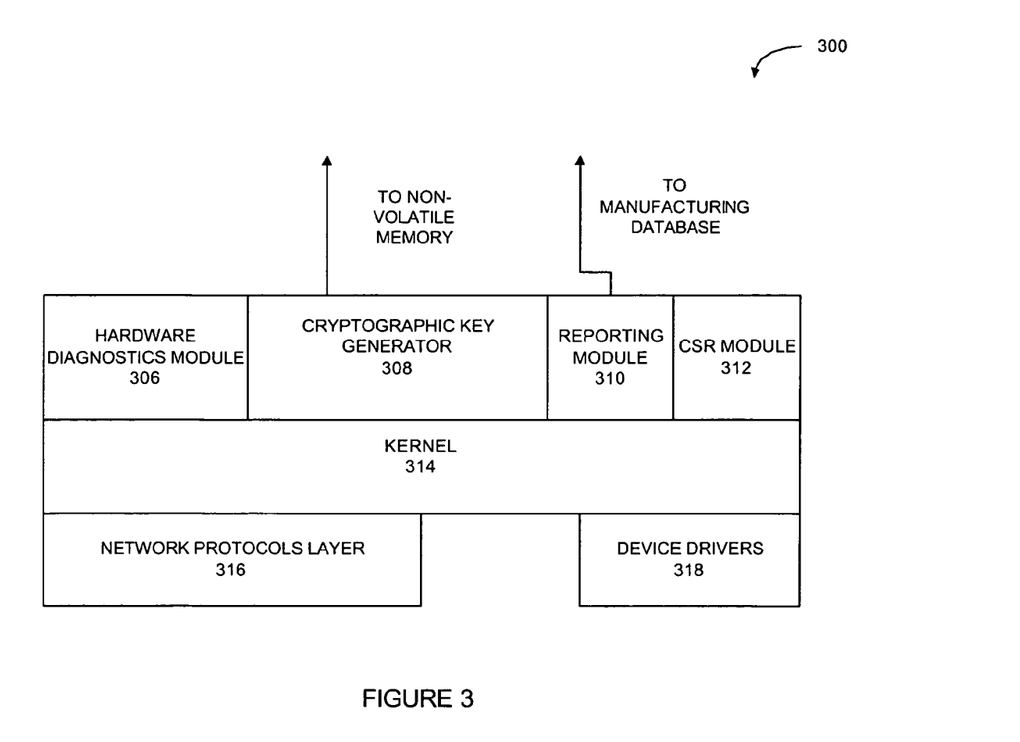
FIG. 3 is a block diagram of an operating system that may run on an appliance, according to one exemplary embodiment of the present invention.

FIG. 3 is a schematic block diagram of an operating system 300 that may be advantageously used with embodiments of the present invention. Operating system 300 includes a plurality of components including: a hardware diagnostics module 306 (to verify the integrity of hardware components present on the appliance), a cryptographic key generator 308, a reporting module 310, a CSR module 312 (to generate a certificate signing request), a kernel 314, device drivers 318, and a network protocols layer 316.

The cryptographic key generator 308 may be utilized to generate the manufacturing key pair that may be used when the CA server 114 needs to verify a CSR received from the appliance. The cryptographic key generator 308 may also generate a larger key pair (e.g., 1024 bits) to be used, for example, to securely deliver updates to the appliance. The cryptographic key generator 308 may also be configured to communicate the prime numbers associated with the manufacturing key-pair to be stored in the non-volatile memory on the appliance (e.g., an EEPROM). The reporting module 310 may be utilized to provide the manufacturing public key and the serial number for the appliance to a manufacturing database (e.g., the verification database 112 of FIG. 1).

The network protocols layer 316, may, as is conventional in the art, include a series of software layers that provide data paths for various electronic devices (e.g., the client 110, the entitlement server 106, the CA server 114, and the download server 108 of FIG. 1) to communicate with the appliance. The kernel 314 may be responsible for providing secure access to the appliance's hardware to various computer programs and for determining when and how long a program should be able to make use of a particular hardware component. The device drivers 318 may be utilized to enable other components of the operating system 300 to interact with various hardware devices associated with the appliance.

It will be noted, that the components illustrated in FIG. 3 may be present in a manufacturing operating system as well as in any general purpose or special purpose operating system installed on the appliance.

Figure 4:
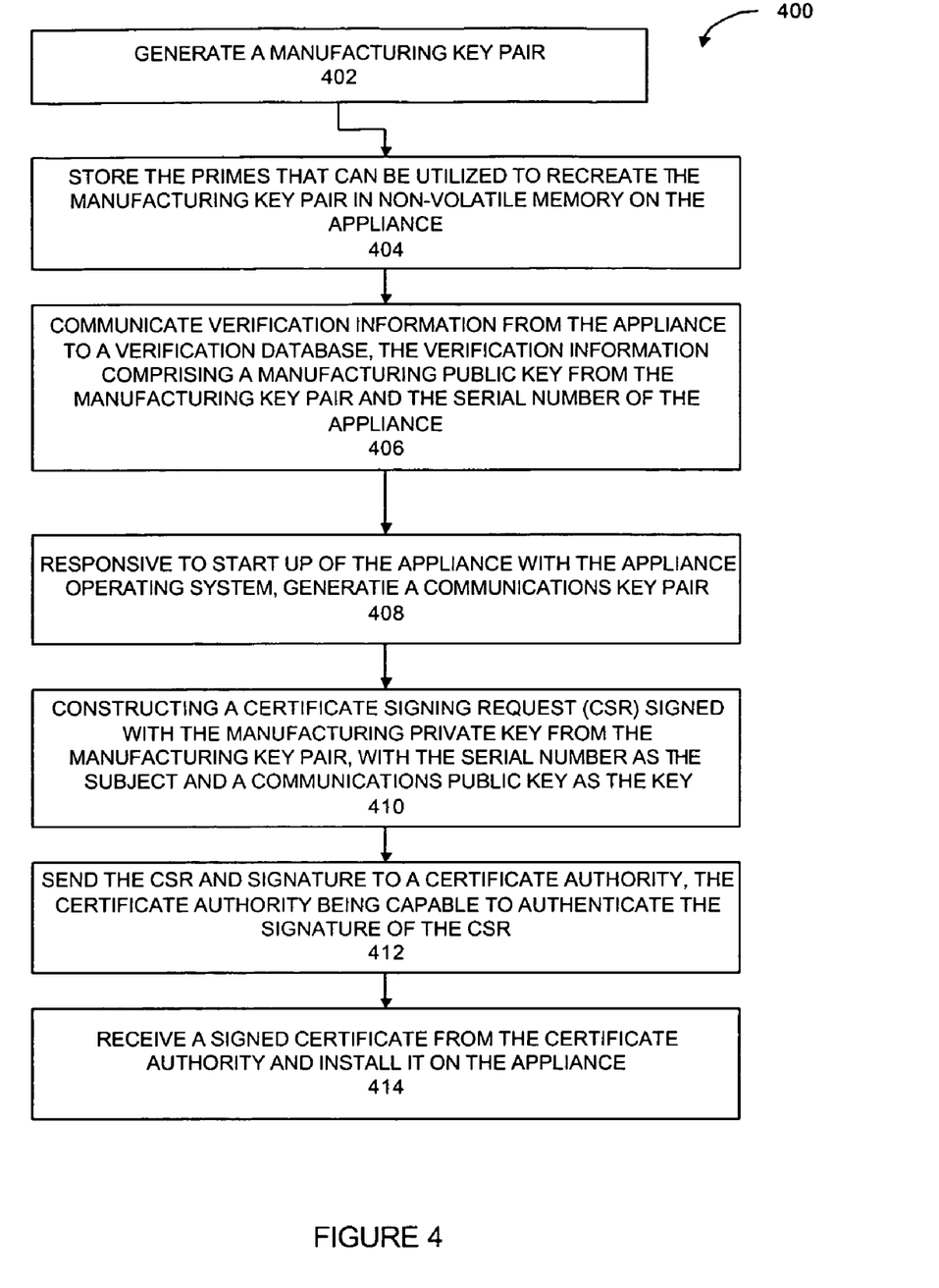
FIG. 4 is a flow chart of a method to generate a cryptographically secure identity for an appliance, according to one exemplary embodiment of the present invention.

FIG. 4 is a flow chart of a method 400 to generate a cryptographically secure identity for an appliance, according to one exemplary embodiment of the present invention. The method may be performed by processing logic that may comprise hardware (e.g., dedicated logic, programmable logic, microcode, etc.), software (such as run on a general purpose computer system or a dedicated machine), or a combination of both.

In one embodiment of the present invention, a cryptographically secure identity (e.g., an RSA key-pair) is generated by the appliance's cryptographic key generator 308 during the manufacturing process (see block 402). This key pair, termed the manufacturing key-pair, may be designated for further generating verification data. Verification data, in one embodiment, comprises the manufacturing public key and the serial number for the appliance. In order to ensure that the manufacturing key-pair may be recreated at a later time by the appliance itself and without the need for any data that is not stored at the appliance, the cryptographic key generator 308 stores, at block 404, the primes that were used to generate the manufacturing key-pair in the non-volatile memory at the appliance (e.g., in an EEPROM). The reporting module 310 communicates the verification data to the verification database 112 at block 406.

Once the manufacturing process is completed, the manufacturing software that was running on the appliance is replaced with appliance software that is intended to fulfill the specialized purpose of the appliance (e.g., a storage operating system, proxy server, etc.). Once the appliance starts up with the appliance software, the cryptographic key generator associated with the appliance software generates a second RSA key-pair. The second key-pair may be termed the communications key-pair, because it may be intended for use when content has to be delivered to the appliance in a cryptographically secure fashion. The communications key-pair is generated at block 408.

At block 410, the CSR module 312 constructs a certificate signing request with the serial number of the appliance as the subject, and the communications public key as the key. The CSR module 312 then signs the CSR using the manufacturing private key recreated based on the prime numbers recovered from the non-volatile memory 206. At block 412, the CSR module 312 sends the CSR and the signature to a certificate authority (CA) (e.g., an entity that has access to the verification database 112 of FIG. 1).

Once the CA signs the CSR, the signed certificate is received at the appliance (block 414). The signed certificate may be referred to as the appliance's "birth certificate." The birth certificate may be then recorded on the disks 208 at the appliance for future authentication purposes. The birth certificate may be used, in some embodiments, to authenticate the appliance to a download server or, for example, to another appliance.

Figure 5:
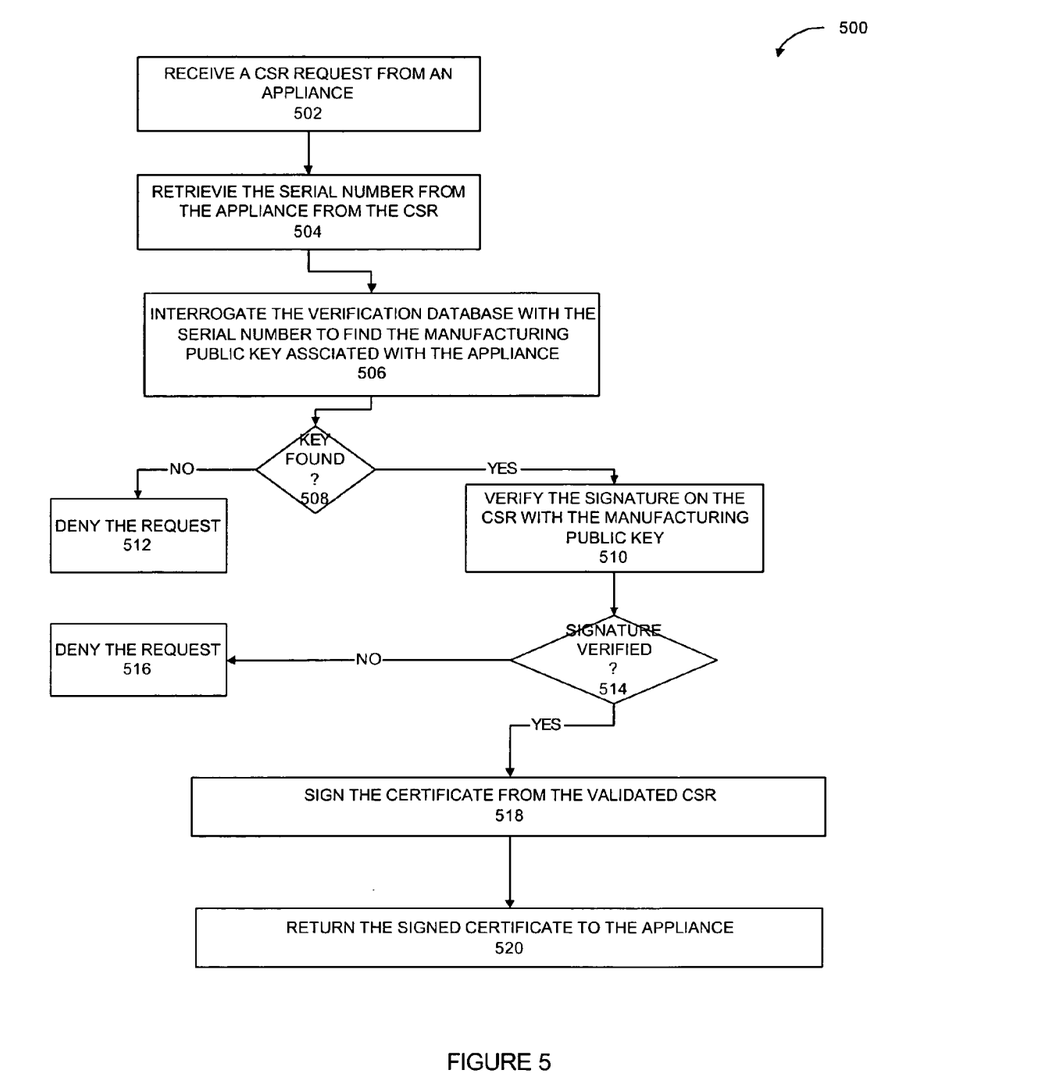
FIG. 5 is a flow chart of a method to obtain a birth certificate from a certificate authority server, according to one exemplary embodiment of the present invention.

FIG. 5 is a flow chart of a method 500 to verify a certificate signing request (CSR) and to return a birth certificate to the requesting appliance, according to one exemplary embodiment of the present invention. The method may be performed by processing logic that may comprise hardware (e.g., dedicated logic, programmable logic, microcode, etc.), software (such as run on a general purpose computer system or a dedicated machine), or a combination of both.

The CA server 114 receives a CSR request from the appliance at block 502. It then extracts the serial number from the CSR (block 504) and interrogates, at block 506, the verification database 112 that stores associations of serial numbers and manufacturing public keys for appliances. If a manufacturing public key associated with that serial number is found in the verification database (block 508), the manufacturing public key is used by the entitlement server 106 to verify the signature on the CSR (block 510). Otherwise, the certificate signing request fails at block 512.

If the signature on the CSR is determined, at block 514, to be valid, the CA server 114 signs the certificate from the CSR (block 518) and returns the certificate signed by its Certificate Authority private key to the appliance (block 520).

Figure 6:
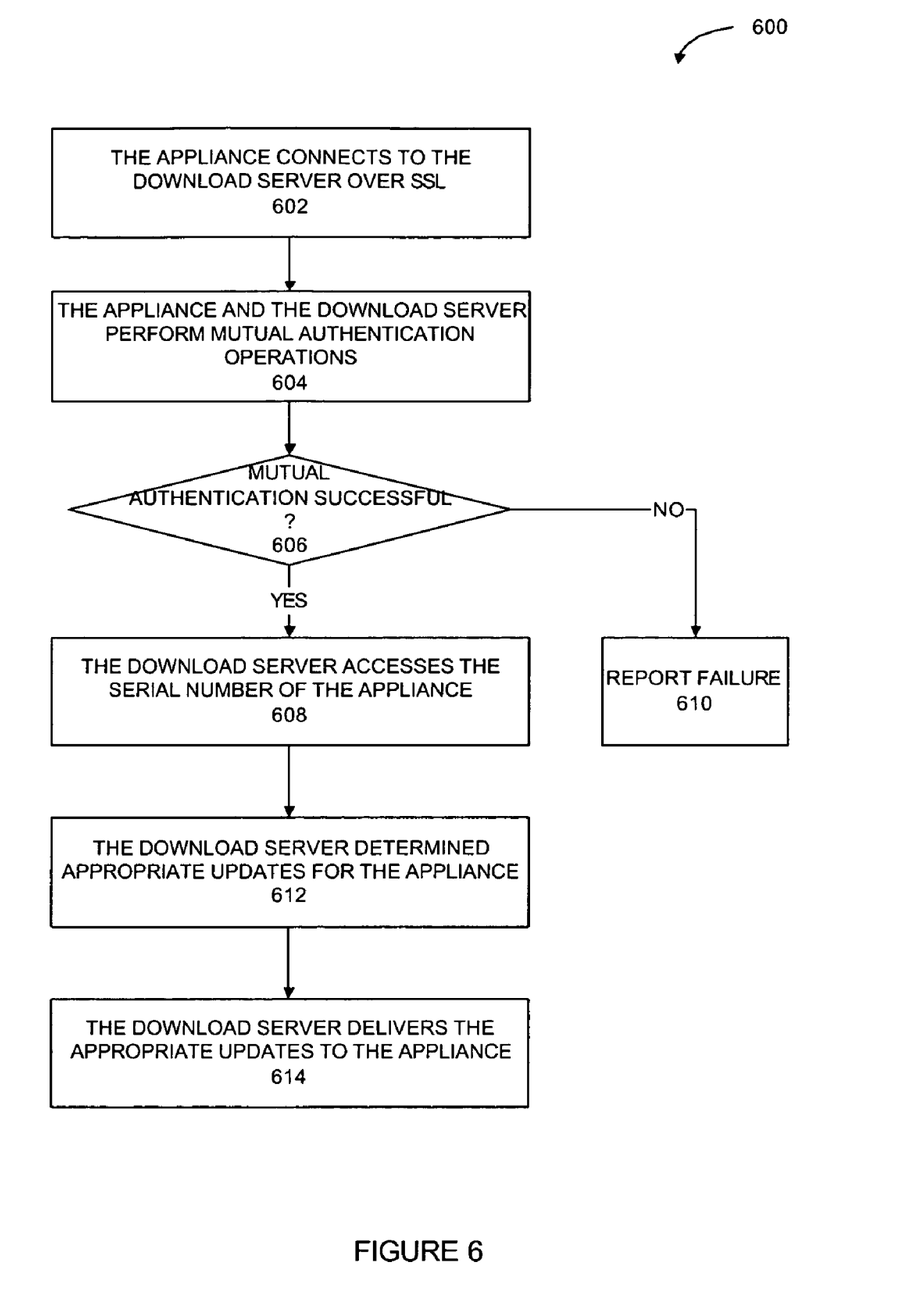
FIG. 6 is a flow chart of a method to securely deliver updates to an appliance, according to one exemplary embodiment of the present invention.

The methods described with respect to FIG. 4 and FIG. 5 may be beneficial in situations where it is desirable to automatically authenticate an appliance as being entitled to receive particular content, such as an update of its operating system. FIG. 6 is a flow chart of a method 600 to securely deliver updates to an appliance, according to one exemplary embodiment of the present invention. When an update becomes available for downloading to appliances that are entitled to the update, an appliance may first attempt to establish an SSL connection with the download server 108 (block 602).

Mutual authentication performed at block 604 may be described as follows. In one embodiment, the download server 108 may require that the appliance supply a certificate signed by a designated Certificate Authority (e.g., the CA server 114) and it is expected that only appliances that have gone through the process described above with respect to FIG. 4 and FIG. 5 will have such a certificate. Thus, if it is determined that the certificate presented by the appliance is valid, the download server 108 concludes that the SSL connection is with the appliance itself, and that the appliance' serial number is indeed the one that is included in the certificate. The appliance authenticates the download server 108 via the download server's X.509 certificate, which in one embodiment is signed by a public certificate authority.

If mutual authentication is successful (block 606), the download server 108, at block 608, accesses the serial number for the appliance present in the certificate and interrogates the entitlement server 106 with the serial number to determine what updates this appliance is permitted to download (block 612). In one embodiment, the entitlement server 106 may determine the appropriate updates for the appliance by looking up the customer record for the customer that owns the appliance and determining what that customer has paid for. The correspondence of appliance serial numbers to appropriate updates may be stored in the entitlement database 116 of FIG. 1. The download server 108 then delivers the appropriate updates to the appliance at block 614. If mutual authentication fails, a failure is reported at block 610.

The use of SSL with mutual authentication, as described above, satisfies the security requirements where the appliance may accept connections only to valid download servers, and the download servers may accept connections only from valid appliances. Furthermore, because the construction of the appliance's manufacturing private key and the subsequent acquisition of the birth certificate require no customer or administrator interaction, the process can be completely automatic and invisible from the standpoint of the appliance owner/user. Thus, although the user name/password credentials may still be utilized if desired, the secure download of updates may be performed without the use of such credentials.

It will be noted that the methods and systems described herein may be applicable to a variety of appliances as well as to general purpose processing systems, and to portable electronic devices such as personal digital assistants (PDAs) and mobile phones. The methods and systems described herein may also be applicable to appliance-to-appliance authentication, allowing automatic authentication within a network of appliances, as well as to authentication of connections between an appliance and its management node.

Figure 7:
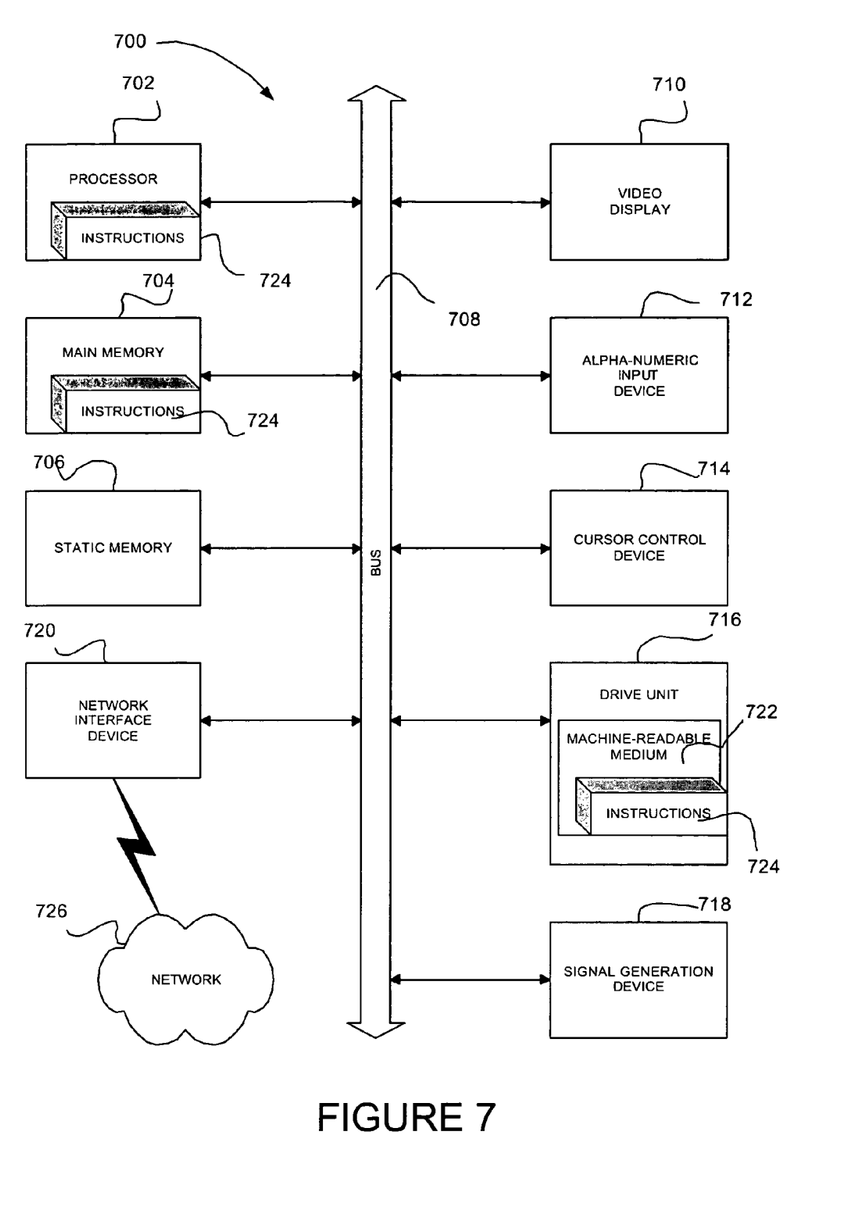
FIG. 7 shows a diagrammatic representation of a machine in the exemplary form of a computer system within which a set of instructions for causing the machine to perform a program configured in accordance with an embodiment of the present invention may be executed.

FIG. 7 shows a diagrammatic representation of a machine in the exemplary form of a computer system 700 within which a set of instructions, for causing the machine to perform a program configured in accordance with an embodiment of the present invention, may be stored and/or executed. In alternative embodiments, the machine operates as a standalone device or may be connected (e.g., networked) to other machines, in which case it may be a node in a network. In a networked deployment, the machine may operate as a server or a client machine in a server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 700 includes a processor 702 (e.g., a central processing unit (CPU) a graphics processing unit (GPU) or both), a main memory 704 and a static memory 706, which communicate with each other via a bus 708. The computer system 700 may further include a video display unit 710 (e.g., a liquid crystal display (LCD) or a cathode ray tube (CRT)). The computer system 700 also includes an alphanumeric input device 712 (e.g., a keyboard), a cursor control device 714 (e.g., a mouse), a disk drive unit 716, a signal generation device 718 (e.g., a speaker) and a network interface device 720.

The disk drive unit 716 includes a machine-readable medium 722 on which is stored one or more sets of instructions (e.g., software) 724 embodying any one or more of the methodologies or functions described herein. The software 724 may also reside, completely or at least partially, within the main memory 704 and/or within the processor 702 during execution thereof by the computer system 700, the main memory 704 and the processor 702 also constituting machine-readable media. The software 724 may further be transmitted or received over a network 726 via the network interface device 720.

While the machine-readable medium 722 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

Thus, a method and system to securely deliver software updates to an appliance have been described. Although the present invention has been described with reference to specific exemplary embodiments, it will be evident that various modifications and changes may be made to these embodiments without departing from the broader spirit and scope of the invention. Accordingly, the true scope of the present invention should be measured only in terms of the claims, which now follow.

What is claimed is:

1. An appliance, comprising:
    a memory;
    a network interface device;
    a processor connected to the memory and the network interface device;
    a key generator configured to generate, via the processor of the appliance, a manufacturing public key for the appliance;
    a reporting module coupled to the key generator and configured to communicate via the network interface device verification data, including the manufacturing public key and a serial number of the appliance, from the appliance to a verification database; and
    a certificate signing request (CSR) module configured to obtain via the network interface device a signed certificate from a certificate authority (CA) based on the verification data stored in the verification database, wherein the CA has access to the verification database.

2. The appliance of claim 1, wherein the key generator is configured to generate the verification data by:
    generating a plurality of prime numbers;

deriving, from the plurality of prime numbers, a manufacturing key pair, the manufacturing key pair including a manufacturing private key and the manufacturing public key; and associating the serial number of the appliance with the manufacturing public key.

3. The appliance of claim 2, further comprising a non-volatile memory configured to store the plurality of prime numbers.

4. The appliance of claim 3, wherein the non-volatile memory is an electrically erasable programmable read-only memory (EEPROM).

5. The appliance of claim 3, wherein the key generator is further configured to recreate the manufacturing private key utilizing the plurality of prime numbers stored in the non-volatile memory.

6. The appliance of claim 5, wherein the CSR includes the serial number of the appliance and the CSR is signed with the manufacturing private key.

7. The appliance of claim 3, wherein the key generator is further configured to generate a communications key pair, the communications key pair comprising a communications public key.

8. The appliance of claim 7, wherein the CSR includes the communications public key as a subject key.

9. The appliance of claim 1, wherein the appliance is a proxy server.

10. A method to permit secure communications with an appliance, the method comprising:
    generating, at the appliance, verification data, including a manufacturing public key and a serial number of the appliance, for the appliance;
    communicating the verification data to a verification database;
    generating, at the appliance, a certificate signing request (CSR) including the serial number of the appliance, wherein the CSR is signed with a manufacturing private key;
    sending the CSR to a certificate authority (CA); and
    obtaining, at the appliance, a signed certificate from the CA based on the verification data obtained from the verification database, wherein the CA has access to the verification database.

11. The method of claim 10, wherein generating the verification data further comprises:
    generating a plurality of prime numbers;
    deriving, from the plurality of prime numbers, a manufacturing key pair, the manufacturing key pair including the manufacturing private key and the manufacturing public key;
    associating the serial number of the appliance with the manufacturing public key; and
    identifying the associated serial number and the manufacturing public key as the verification data.

12. The method of claim 11, further comprising storing, in a non-volatile memory of the appliance, the plurality of prime numbers.

13. The method of claim 12, wherein obtaining the signed certificate further comprises:
    receiving the signed certificate;
    accepting the signed certificate; and
    storing the signed certificate at the appliance.

14. The method of claim 10, further comprising generating a communications key pair, the communications key pair comprising a communications public key.

15. The method of claim 14, wherein the CSR includes the communications public key as a subject key.

16. The method of claim 15, further comprising:
    establishing a secure connection with a download server utilizing the signed certificate; and
    receiving a software update from the download server according to the serial number of the appliance.

17. The method of claim 15, further comprising establishing a secure connection with another appliance utilizing the signed certificate.

18. The method of claim 15, further comprising establishing a secure connection with a management node associated with the appliance, utilizing the signed certificate.

19. A method to permit secure communications with an appliance, the method comprising:
    receiving, from the appliance, a certificate signing request (CSR) signed with a manufacturing private key from a manufacturing key pair, wherein the CSR includes a serial number of the appliance and a communications public key from a communications key pair;
    extracting the serial number from the CSR;
    interrogating a verification database with the serial number to access a manufacturing public key associated with the serial number;
    verifying the signature on the CSR with the manufacturing public key; and
    responsive to verifying the signature on the CSR with the manufacturing public key, returning a signed certificate to the appliance.

20. A non-transitory tangible machine-readable medium having stored thereon data representing sets of instructions which, when executed by a machine, cause the machine to:
    generate, at a processing system of an appliance, verification data, including a manufacturing public key and a serial number of the appliance, for the processing system;
    communicate the verification data from the processing system of the appliance to a verification database; and
    obtain a signed certificate from a certificate authority (CA), based on the verification data stored in the verification database, wherein the CA has access to the verification database.

* * * * *